United States Patent [19]

Fukuda et al.

[11] 4,262,312
[45] Apr. 14, 1981

[54] MAGNETIC RECORDING AND PRINTING DEVICE FOR CARD MEDIUMS

[75] Inventors: Kazumi Fukuda, Kobe; Takeshi Horino; Katsuhiro Komorida, both of Yokohama, all of Japan

[73] Assignees: Matsushita Communication Industrial Co., Ltd., Yokohama; Mitsubishi Heavy Industries, Limited, Tokyo, both of Japan

[21] Appl. No.: 19,589

[22] Filed: Mar. 12, 1979

[30] Foreign Application Priority Data

Mar. 15, 1978 [JP] Japan ............................... 53-30446
Mar. 15, 1978 [JP] Japan ............................... 53-30449

[51] Int. Cl.$^3$ .......................................... G11B 25/04
[52] U.S. Cl. ......................................... 360/2; 101/36; 101/37; 235/432; 235/433
[58] Field of Search ................ 360/2; 346/66; 101/36, 101/37; 235/493, 432, 433

[56] References Cited

U.S. PATENT DOCUMENTS

| | | | |
|---|---|---|---|
| 3,508,032 | 4/1970 | MacDuffee et al. | 360/2 |
| 3,646,532 | 2/1972 | Winter | 360/2 |
| 3,801,804 | 4/1974 | Glahn et al. | 360/2 |
| 4,025,956 | 5/1977 | Nozaki et al. | 360/2 |

*Primary Examiner*—Vincent P. Canney
*Attorney, Agent, or Firm*—Stevens, Davis, Miller & Mosher

[57] ABSTRACT

A magnetic recording and printing device for card mediums, having a magnetic recording section and a printing section, wherein the card mediums are transferred along the peripheral surface of a rotary cylinder which serves as a platen for printing, and during the transfer of the card mediums, data are magnetically recorded and read out by a magnetic head stationarily disposed close to but separated from the peripheral surface of the rotary cylinder.

3 Claims, 4 Drawing Figures

MAGNETIC RECORDING AND PRINTING DEVICE FOR CARD MEDIUMS

BACKGROUND OF THE INVENTION

The present invention relates to a magnetic recording and printing device for a card medium, capable of recording and printing data on a card medium at a high speed.

Card-shaped information mediums having magnetic recording surfaces, referred to generally as "magnetic medium", having various uses such as toll tickets for an expressway and the like, and their use is widespread.

Conventionally, the recording and reading of information to and from the card medium, and the printing of information on the same have been made by means of a device having a printing section and a magnetic recording/reading section which are designed and constructed separately from each other. Therefore, for effecting the magnetic recording and the printing, it is necessary to transfer the card medium from one to the other of the magnetic recording/reading and the printing sections. The conventional device requires a complicated transfer mechanism for transferring the card medium. At the same time, the conventional device tends to suffer various trouble such as fluctuation of the transfer speed of the card medium, jamming of the card medium in the device and so on.

There has been proposed also a device for effecting a printing and magnetic recording on the card mediums over a plurality of lines. In this device, the card medium is statically positioned at a printing station, while a printing head is reciprocatingly moved over a plurality of lines, so as to effect the printing over these lines, and thereafter the card medium is removed. Therefore, the construction of the device is highly complicated, and is likely to incur trouble such as jamming.

SUMMARY OF THE INVENTION

It is therefore an object of the invention to provide a magnetic recording and printing device for card mediums, which is free from the above-stated problems of the prior art.

To this end, according to the invention, there is provided a magnetic recording and printing device for card mediums capable of effecting a magnetic recording and printing stably at a high speed, in which the magnetic recording and the printing are conducted sequentially or simultaneously, while the card medium is clamped between the surface of a rotary cylinder rotating at a constant speed and a belt going round the cylinder surface.

According to another aspect of the invention, there is provided a magnetic recording and printing device for card mediums, in which, by using the conventional device capable of performing a printing in only one line, a printing over a plurality of lines can be made.

The above and other objects, as well as advantageous features of the invention will become more clear from the following description of the preferred embodiments taken in conjunction with the accompanying drawings.

DESCRIPTION OF THE PREFERRED EMBODIMENTS

Figure 1:
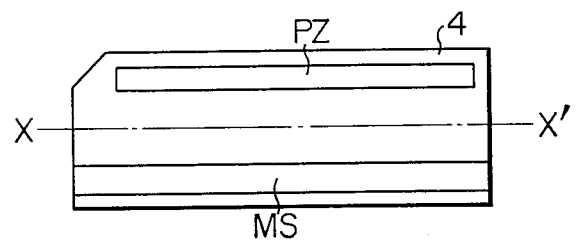
FIG. 1 is a plan view of a card medium.

Referring first to FIG. 1, a card medium has a substantially rectangular form as illustrated. A printing zone PZ and a magnetic recording surface MS are provided to both sides of the longitudinal axis X-X' respectively. The middle portion of the card medium, in which the axis X-X' extends, is adapted to be made into contact with a later-mentioned transfer belt of the device of the invention, and conveyed in the axial direction X-X' with a cut corner edge thereof being placed on the leading side.

Figure 2:
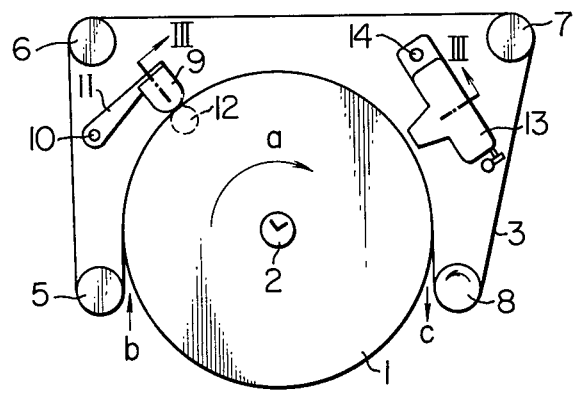
FIG. 2 is a top view of a magnetic recording and printing device for card mediums, in accordance with an embodiment of the invention.
Figure 3:
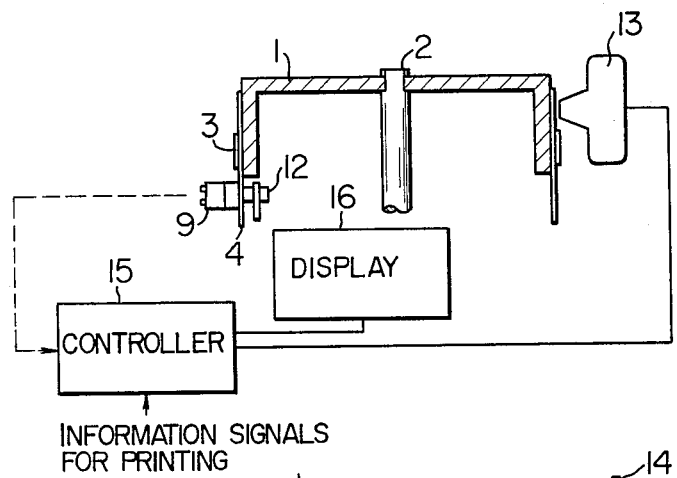
FIG. 3 is a sectional view taken along the line III—III of FIG. 2.

Referring now to FIGS. 2 and 3, a rotary cylinder 1 is adapted to be rotated around a shaft 2 in the direction of an arrow a. A transfer belt 3 is adapted to cooperate with the rotary cylinder 1, clamping therebetween a card medium 4 and conveying the same in the direction of rotation of the rotary cylinder. Reference numerals 5 to 8 denote pulleys around which the transfer belt turns. At least one of these pulleys is connected to a motor so as to transmit the torque of the motor to the belt 3, thereby to drive the latter.

A magnetic head 9 is supported by an arm 11 which is pivoted by a shaft 10, while a roller-shaped pad 12 is disposed opposite to the magnetic head 9.

A reference numeral 13 denotes a printing head of wire-dot type. Annexed parts such as printing ribbon have been neglected for a clarification of the drawings.

In operation, the rotary cylinder 1 is rotated in the direction of the arrow a, as the belt 3 is driven. Then, the card medium 4 is placed between the surface of the rotary cylinder 1 and the belt 3, as shown by an arrow b. Then, the card medium 4 is transferred at a constant speed while being sandwiched between the rotary cylinder 1 and the transfer belt 3, and a magnetic recording is performed as the magnetic recording surface MS of the card medium 4 is contacted by the magnetic head 9 which is stationarily mounted. Subsequently, a printing is effected by the printing head 13 on the printing zone PZ, as the card medium is transferred to the position of the printing head 13. Finally, the card medium 4 with which the magnetic recording and the printing have been completed is ejected as shown by an arrow c. It will be seen that the magnetic recording and the printing are successively made at a high speed.

The roller 12 is designed and constructed so that its outer peripheral surface aligns with the outer peripheral surface of the cylinder 1. In other words, the peripheral surface of the rotary cylinder 1 and that of the roller 12 have a common vertical tangential plane at their extremities confronting the magnetic head 9.

Therefore, the roller 12 is frictionally driven by the card medium 4 which is transferred by the transfer belt 3 and the cylinder 1. Thus, the roller 12 serves as a part of the peripheral surface of the cylinder 1, as if the latter were to oppose to the recording head 9. Thus, the magnetic surface MS is supported by the roller 12 and held in a stable contact with the magnetic head 9 during the recording even when the card thickness varies from card to card.

On the other hand, when no card medium is placed between the magnetic head 9 and the roller 12, no sliding contact is made between these two members, because the roller is not rotated, so that unnecessary wear of the magnetic head 9 is avoided. Needless to say, it is possible to place the magnetic head 9 at the inside of the rotary cylinder 1, insteadly of the outside.

A reference numeral 15 denotes a controller adapted to effect a control of the printing performed by the printing head in accordance with the information delivered by the magnetic head 9, while a numeral 16 dentoes a display for displaying the state of the control.

The magnetic recording and printing device of this embodiment offers various advantages. Firstly, a complicated carriage mechanism is dispesable, because it is not necessary to move the magnetic head 9 nor the printing head 13. Secondly, the construction can be much simplified, because the rotary cylinder can serve the double role of a transfer means and a printing platen. Thirdly, the transfer mechanism constituted by the belt and the cylinder can ensure smooth and stable running of the card medium, even under the resistance imparted by the magnetic head and the printing head. Fourthly, the device of the invention is easy to handle, because the insertion and ejection of the card medium are made at the same side of the device. As a result, the magnetic recording and the printing are performed at a high speed.

Figure 4:
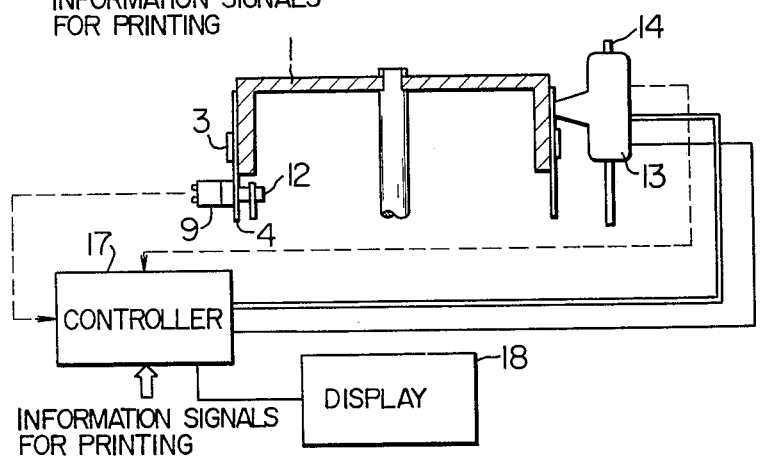
FIG. 4 is a view similar to that of FIG. 3 but showing another embodiment.

FIG. 4 shows another embodiment of the invention in which the printing head 13 is adapted to be moved up and down along a shaft 14 by means of mechanism including a stepped cam or pulse motor, as used in multi-channel stereo set for automobiles, so as to effect a printing over a plurality of lines.

In operation, the printing head 13 is set at a position corresponding to the line on which the printing is to be made. In this state, the cylinder 1 is being rotated in the direction of the arrow a, in accordance with the movement of the belt 3. Then, as the card medium 4 is inserted as shown by the arrow b, the card is clamped between the cylinder 1 and the belt 3, and is conveyed at a constant speed, and the recording is then effected as the magnetic surface of the card medium is brought into contact with the magnetic head 9. In this case, a multihead type magnetic head is used as the magnetic head 9. Subsequently, the printing is effected on the printing region, by means of the printing head 13, and the card medium is ejected in the direction of the arrow c. The magnetic recording and the printing are thus effected successively. For a printing in the second line, the printing head 13 is moved vertically along the shaft 14 by one pitch of the lines. The card medium in which the printing has been finished with the first line is again inserted as the arrow b, for the printing in the second line.

Upon the printing operation on the second line of the successive card mediums, there is the risk of the insertion of a card medium other than those in which the printing in the first line has been finished is erroneously inserted. In such a case, it is necessary to detect the erroneous insertion, and to effect such a control as to check and avoid the printing on the erroneously inserted card.

The described embodiment makes use of the 25 magnetic recording, in order to effect such a control, as well as to control the position of the printing. Namely, a code representative of the step of the process is recorded in a part of the magnetic recording surface MS. It is therefore possible to discriminate whether the correct steps have been taken, by reading the code at each time of the processing. For further ensuring a correct processing by an operator, the magnetic recording an printing device of this embodiment can incorporate means for imparting a visible sign such as characters or letters to the operator. For instance, when a new blank card is erroneously inserted instead of the preceding card which neccesitates the completion of the printing in the desired plural lines thereon, a visible sign is given in a display or the like to inform the operator of the errornous insertion, thereby to suggest that he corrects the operation. Such a process is performed by a controller 17 which is adapted to effect the control of the magnetic element of the magnetic head 9, as well as the control of the position and operation of the printing head 13, in accordance with information derived from the magnetic head 9 and the information concerning the position of the printing head 13. A reference numeral 18 denotes a display which corresponds to the display 16 as shown in FIG. 3.

In order to effectively carry out the abovestated processing, it is necessary to carry out, in a single pass of the card medium, both functions, that is: magnetic reading and magnetic recording or writing. To this end, it is possible to arrange a magnetic head for reading and a magnetic head for writing in series along the path of the card medium.

The writing and reading of the signals having information corresponding to various steps of processing can be achieved by ordinary techniques of magnetic recording and reproduction and by means of ordinary logic circuitry. The circuits and parts for these magnetic recording and reading processes other than the magnetic head 9 therefore have been neglected from FIG. 2.

The detection of the position of printing head 13 can be achieved by a combination of a mechanical sensor mounted on the printing head and adapted to mechanically sense the position, and by a logical circuit for discrimianting the signal derived from the sensor.

As has been described, according to the invention, there is provided a magnetic recording and printing device for a card medium which can perform the magnetic, recording, a well as printing over a plurality of lines, economically and highly reliably, with a much simplified construction, while imparting a sign informing the correct operation to the operator by making a positive use of the advantage of the magnetic card medium.

The device of the invention can be used most effectively, in a work where the printing is made in a single line rather than where the printing in a plurality of lines is required because the device can perform the work at a high speed particularly when the printing is made in a single line.

What is claimed is:

1. A magnetic recording and printing device for card mediums adapted to effect a magnetic recording and a printing on a card medium comprising: a rotary cylinder having an outer peripheral surface; a transfer belt adapted to run in contact with a part of the outer peripheral surface of said rotary cylinder with said card medium being clamped and held therebetween; a printing head having a part of the outer peripheral surface of said rotary cylinder used as a platen; a freely rotatable roller having an outer peripheral surface whose generating line coincides with the extension of a line formed between the outer peripheral surface of said rotary cylinder and a plane tangential to the latter said roller being rotated only by a card carried by said belt; a magnetic head disposed in a different position from that of said printing head oppositely to the outer peripheral surface of said roller, and closely to the extension of the line formed between the outer peripheral surface of said rotary cylinder and the plane tangential to the latter thereby a magnetic recording is made by said magnetic head and then a printing is made by said printing head when a card medium is moved in accordance with the running of said belt and the rotation of said rotary cylinder.

2. A magnetic recording and printing device as claimed in claim 1, wherein said magnetic head is fixed to an arm which is biased toward said roller.

3. A magnetic recording and printing device as claimed in claim 1, wherein said roller is positioned on the inside of said rotary cylinder and said magnetic head is positioned on the outside of said rotary cylinder.

* * * * *